United States Patent [19]

Goris

[11] 4,440,432

[45] Apr. 3, 1984

[54] SELF-LOCKING, QUICK RELEASE, LATCHED HOOK

[75] Inventor: Hugo M. J. Goris, Boortmeerbeek, Belgium

[73] Assignee: The Crosby Group, Inc., Tulsa, Okla.

[21] Appl. No.: 350,862

[22] Filed: Feb. 22, 1982

[51] Int. Cl.³ .............................................. B66C 1/36
[52] U.S. Cl. .............................. 294/82 R; 24/241 SB
[58] Field of Search ................. 294/78 R, 82 R, 83 R; 24/232–235, 241 P, 241 PP, 241 SB

[56] References Cited

U.S. PATENT DOCUMENTS

| | | | |
|---|---|---|---|
| 1,521,811 | 1/1925 | Hartbauer | 24/241 SB |
| 1,532,927 | 4/1925 | Nowland | 24/241 SB |
| 1,915,524 | 6/1933 | Fraser | 24/241 SB |
| 2,514,656 | 7/1950 | Manson | 24/241 PP |
| 3,548,465 | 12/1970 | Workman | 24/241 SB |
| 3,575,458 | 4/1971 | Crook et al. | 294/82 R |
| 4,050,730 | 9/1977 | Tada et al. | 24/241 SB X |

FOREIGN PATENT DOCUMENTS 920392  3/1963  United Kingdom ............. 294/82 R

Primary Examiner—Johnny D. Cherry
Attorney, Agent, or Firm—Head, Johnson & Stevenson

[57] ABSTRACT

A self-locking, quick release, latched, antifouling hook comprising a J-shaped body encircling a bowl with a latch pivotally attached to the body and held in contact with the hook tip, under spring tension, thus closing the throat of the hook. A spring tensioned, lever arm is pivotally attached to the latch and, in the locked position, is rigidly held engaged to the J-shaped body. Such a hook can be readily opened by intentionally compressing the lever arm into the latch and then, continuing with the same motion, the latch is opened by further compression of both the lever arm and the latch, into the bowl of the hook.

1 Claim, 7 Drawing Figures

SELF-LOCKING, QUICK RELEASE, LATCHED HOOK

BACKGROUND OF THE INVENTION

1. Field of the Invention

This invention relates to lifting hooks; more specifically, the invention relates to a latched hook that is self-locking, yet readily unlocked.

2. Description of the Prior Art

The use of a hook at the end of a chain, rope, or cable and the like has long been employed for a variety of purposes. Thus, it is generally known that the hook can be fastened to the chain, rope, or cable by an eyelet, clevis, or other attachment system. It is also known to place a latch between the tip or point of the hook and the body or shank of the hook thus pivotally closing the hook opening or mouth when in use, thus securing the loop, eyelet, link or the like which is engaged to and being held by the hook.

However, such latching hooks have suffered from deficiencies particularly when employed in conjunction with a so-called antifouling hook wherein the hook is intentionally designed to allow for maximum freedom of movement between the hook and fastened loop with minimum fouling or snagging. In such cases, a fastened loop will be free to slide up the latch and in the absence of a locking mechanism will be able to open and break free of the hook if tension in the proper direction is applied. While, the presence of a locking mechanism will prevent the undesirable release of the held member, up to this time the presence of a locking mechanism also reduces the ease of connecting and disconnecting the hook and/or inhibits the antifouling characteristics of the hook.

SUMMARY OF THE INVENTION

In view of the deficiencies in the prior art devices, I have discovered an improved self-locking, latched, antifouling lifting hook. The improved lifting hook comprises a substantially J-shaped body encircling a throat with an attachment means located at the top of the J-shaped body and a point or tip of the hook located at the other end thus forming a mouth opening of the hook. A spring loaded or biased (i.e., spring tension held) latch means pivotally attached (hinged) to the J-shaped body is held in contact to the point of the hook closing the mouth opening. A novel spring loaded, hinged locking means is pivotally attached to the latch and rigidly engaged to the J-shaped body when locked thus preventing the latch from opening. The present invention provides for the locking means to unlock by a pivotal motion relative to the latch in the same direction as the pivotal motion of the latch relative to the J-shaped body when the latch opens. It is further provided that the closing latch be pivotally attached to the J-shaped body and capable of rotating into the throat when the latch opens and, at the same time, the locking means is pivotally attached to the pivoting latch and capable of rotating into the latch to disengage (unlock) from the J-shaped body and then further rotate with the latch while it opens. Such a device and structure is self-locking and quick releasing yet compatible with the general concept of antifouling.

It is a primary object of the present invention to provide an antifouling hook with a self-locking latch. It is a further object that the locked latch be easily and readily intentionally unlocked such as to allow insertion or withdrawal of a loop, eyelet, link or the like from the throat of the hook whereupon the latch will spontaneously close and relock. Fulfillment of these objects and the presence and fulfillment of other objects will be apparent upon complete reading of the specification in view of the attached drawings and claims.

DESCRIPTION OF THE PREFERRED EMBODIMENTS

The self-locking, quick release, latched hook of the present invention, how it functions, and the advantages of its use over the prior art devices can perhaps be best explained and understood by reference to the accompanying drawing.

Figure 1:
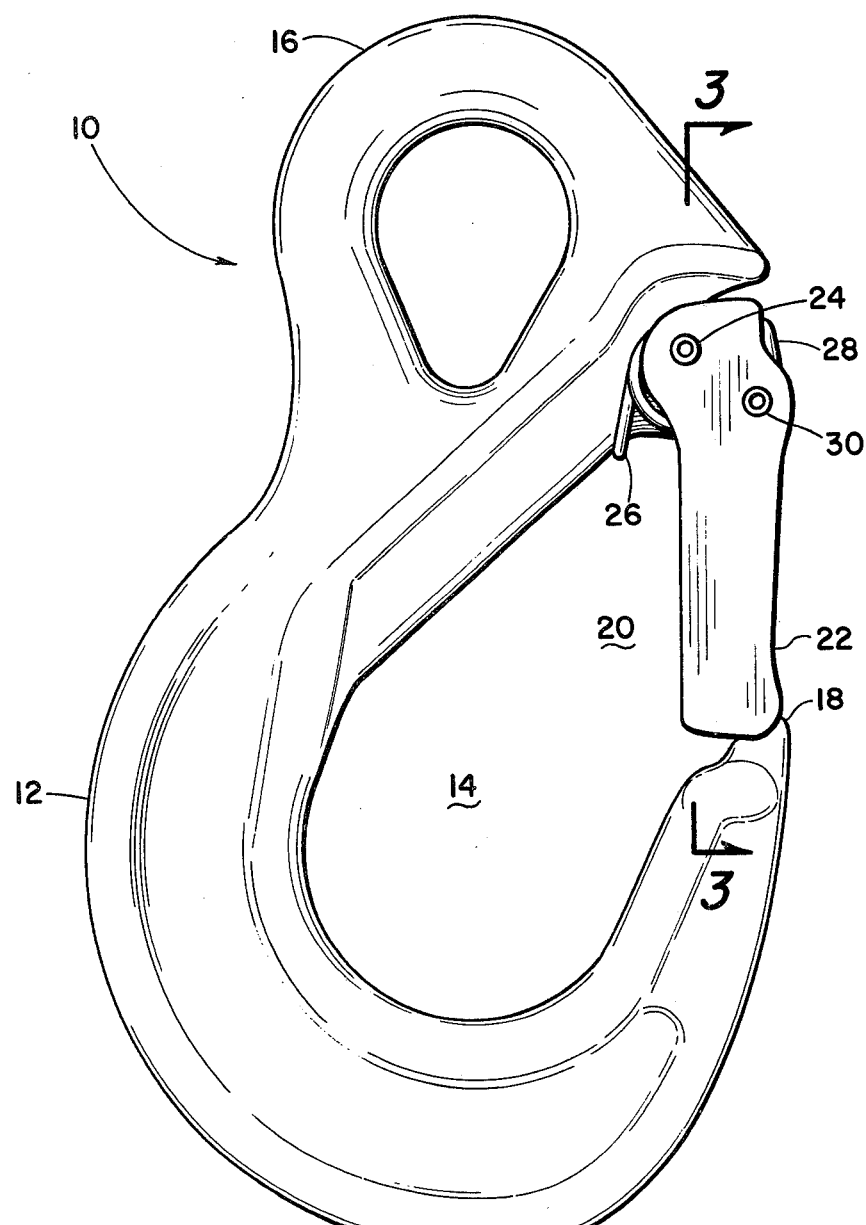
FIG. 1 is a side view of the self-locking, quick release, latched, antifouling hook according to the present invention.
Figure 3:
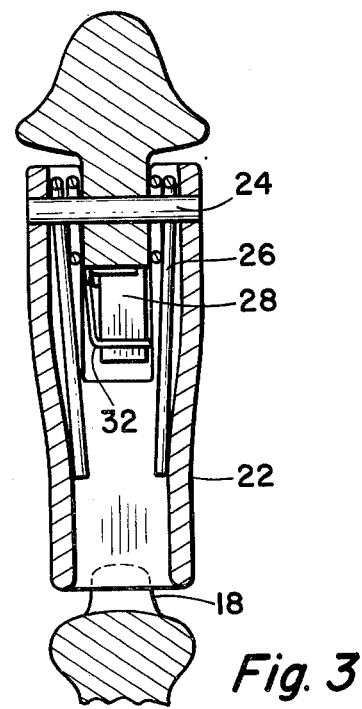
FIG. 3 is a partial cross-sectional view of the locking means and latch of the hook of FIG. 1 through line 3—3.
Figure 5:
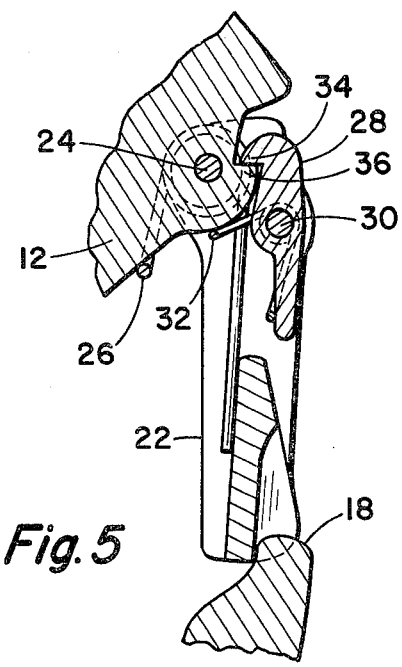
FIG. 5 is a partial cross-sectional view of the latching and locking means of the hook as viewed through line 5—5 of FIG. 2 with the latch closed and locked.

FIG. 1 illustrates a side view of a particularly preferred embodiment of a hook according to the present invention, generally designated by the numeral 10. The hook is made up of a substantially J-shaped body 12 encircling a bowl 14 wherein an eyelet 16 is located at one end such as to attach the hook to a cable, chain, wire rope or the like (not shown). At the other end of the substantially J-shaped body is the tip or point 18 of the hook thus defining the so-called throat opening 20 of the hook. Across the throat 20 is a latch 22 which is pivotally attached to the body of the hook 12 by pin 24 and makes contact with the tip 18 on the interior of the bowl 14 thus closing the throat 20. A spring 26 coiled around the pin 24 makes contact with the underside of latch 22 as well as the J-shaped body 12 (see FIGS. 3 and 5) and maintains tension on the latch holding it in the closed configuration.

Figure 2:
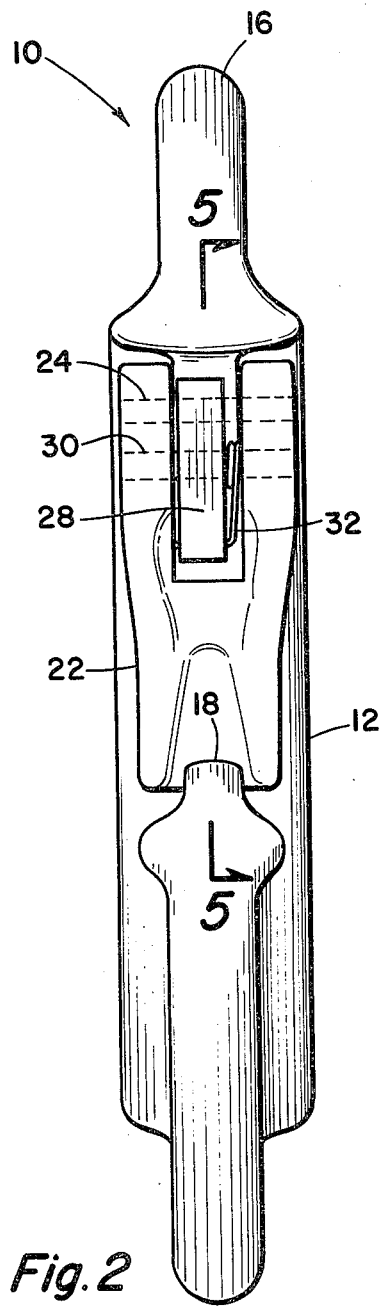
FIG. 2 is a frontal view of the hook of FIG. 1.
Figure 4:
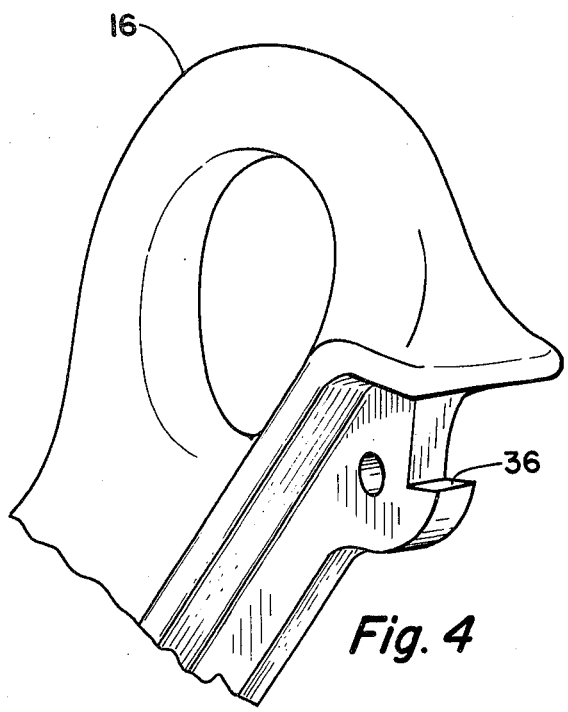
FIG. 4 illustrates the upper portion of the hook of FIG. 1 with the latch and locking means removed.

As illustrated in FIG. 2, a lever arm locking means 28 is pivotally attached to the upper portion of the latch 22 by pivot pin 30. A second spring 32 coiled around pin 30 and in contact with the underside of the locking lever arm 28 and J-shaped body 12 maintains spring tension on the locking means in the same relative rotational direction as the spring 26 accomplishes and maintains tension relative to J-shaped body 12 and latch 22. In this manner and as illustrated in the partial cut-away cross-ssectional view of FIG. 5, the cogged head 34 of locking lever arm 28 will engage shelf or ledge 36 (see FIG. 4) of the J-shaped body 12 when latch 22 is closed and will prevent (lock) the latch 22 from rotation about pin 24.

Figure 6:
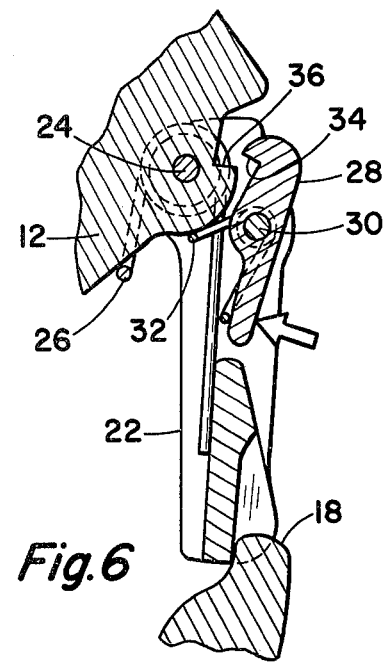
FIG. 6 is a partial cross-sectional view of the latching and locking means of the hook as viewed through line 5—5 of FIG. 2 with the latch closed and unlocked.
Figure 7:
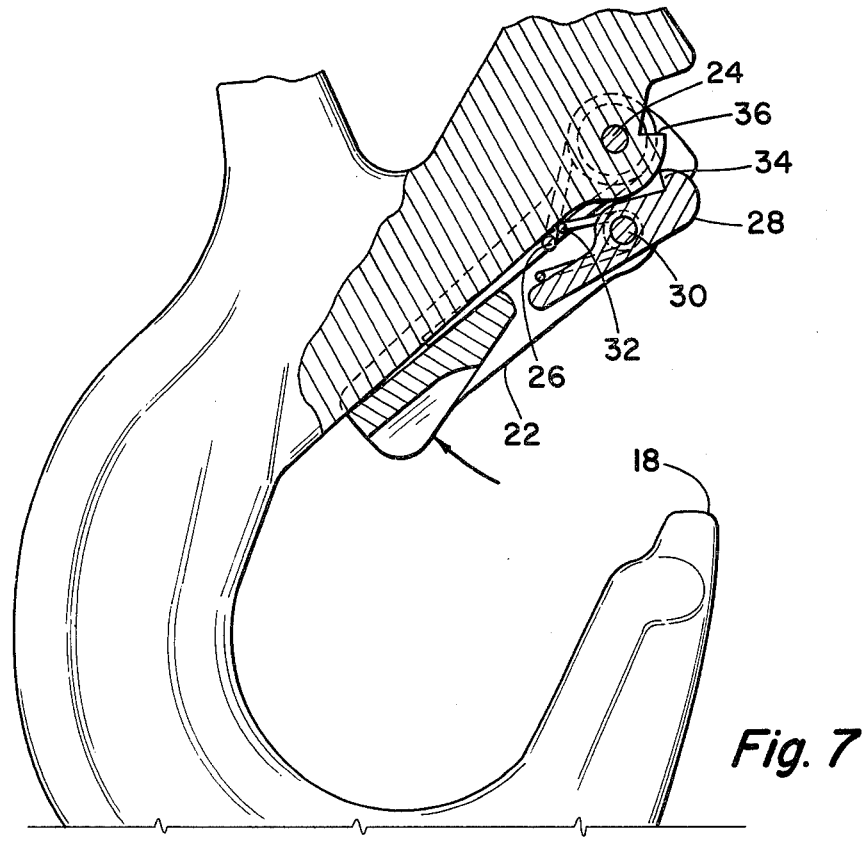
FIG. 7 is a partial cross-sectional view of the latching and locking means of the hook with the latch unlocked and fully opened.

In order to unlock latch 22 and as illustrated in FIG. 6, a force sufficient to rotate the lever arm 28 into the latch 22 is applied. Initially this motion will disengage the cogged upper head 34 of lever arm 28 from the locking ledge 36 of J-shaped body 12. Continued application of the force will then rotate both the unlocked lever arm 28 and the latch 22 into the bowl of the hook thus opening the throat of the hook 20 as illustrated in FIG. 7. In this position both springs 26 and 32 are being held under sufficient compression to cause the latch to automatically swing back to the closed position and to lock lever arm 28 by engaging the ledge 36 when released.

The improved locking means and latch of the present invention can be advantageously employed with generally any lifting hook known in the art. It is particularly useful when employed with an antifouling hook in that the locking lever (as previously illustrated) can be mounted essentially within the latch thus requiring the intentional insertion of a finger or the like to unlock the mechanism. Thus the overall design is compatible with preserving the antifouling characteristics of the hook and latch and does not involve additional external protrusions which subject the hook and latch to snagging and the like.

Since the locking means and latch are operated in a common direction, the hook according to the present invention can be advantageously opened with one hand thus freeing the other hand to guide a sling, link, eyelet, or the like into or from the bowl of the hook. And, since the locking lever is essentially recessed within the latch and is self-locking, the likelihood of the latch accidentally opening when slack occurs at the hook is virtually nonexistent.

While the invention has been described with a certain degree of particularity, it is manifest that many changes may be made in the details of construction and arrangement of components. It is understood that the invention is not to be limited to the specific embodiments set forth herein by way of exemplification, but the invention is to be limited only by the scope of the attached claims, including the full range of equivalents to which each element thereof is entitled. For example, although this invention has been described relative to an eye-hook, it is to be understood that the invention is applicable to other types of hooks; e.g., shank hooks, clevis hooks, etc., the basic improvement over the prior art being the provision of the quick release, self-locking, latched hook having a relatively clean profile, eliminating parts that protrude or extend outward from the normal contours of the hook.

I claim:

1. A self-locking, quick release, latched, anti-fouling lifting hook comprising:

a substantially J-shaped body;

an attachment means located at the top end of said J-shaped body;

a point located at the other end of said body, thus defining the throat of said hook;

a rib projecting into the throat adjacent said top end, said rib including a locking ledge;

a spring loaded latch means, pivotally attached to said rib and held, under tension, for inward movement from a first position in contact with said point and thus closing said throat to a second position substantially straddling said rib;

a lever arm means pivotally attached to said latch means having a cog formed at one end thereof to be engageable with said locking ledge to prevent inward movement of said latch means, a spring normally biasing said lever arm means cog into said locking ledge, the other end of said lever arm means adaptable to be moved into the same said inward direction as the pivotal movement of said latch means from said first to said second position whereby, substantially simultaneously, said cog is released and said latch means moved.

* * * * *